US012764762B2

(12) United States Patent
Ren et al.

(10) Patent No.: US 12,764,762 B2
(45) Date of Patent: Oct. 13, 2026

(54) RESOURCE CONFLICT INDICATION METHOD, AND TERMINAL, APPARATUS AND STORAGE MEDIUM

(71) Applicant: DATANG MOBILE COMMUNICATIONS EQUIPMENT CO., LTD., Beijing (CN)

(72) Inventors: Xiaotao Ren, Beijing (CN); Yan Tian, Beijing (CN)

(73) Assignee: DATANG MOBILE EQUIPMENT COMMUNICATIONS EQUIPMENT CO., LTD., Beijing (CN)

( * ) Notice: Subject to any disclaimer, the term of this patent is extended or adjusted under 35 U.S.C. 154(b) by 311 days.

(21) Appl. No.: 18/294,530

(22) PCT Filed: Jun. 8, 2022

(86) PCT No.: PCT/CN2022/097605

§ 371 (c)(1),
(2) Date: Feb. 1, 2024

(87) PCT Pub. No.: WO2023/010996

PCT Pub. Date: Feb. 9, 2023

(65) Prior Publication Data

US 2024/0349305 A1 Oct. 17, 2024

(30) Foreign Application Priority Data

Aug. 5, 2021 (CN) ......................... 202110897537.2

(51) Int. Cl.

*H04W 72/25* (2023.01)
*H04W 72/40* (2023.01)
*H04W 72/566* (2023.01)

(52) U.S. Cl.

CPC ........... *H04W 72/25* (2023.01); *H04W 72/40* (2023.01); *H04W 72/566* (2023.01)

(58) Field of Classification Search

CPC .... H04W 72/25; H04W 72/40; H04W 72/566

(Continued)

(56) References Cited

U.S. PATENT DOCUMENTS 11,683,787 B2 * 6/2023 Li ......................... H04W 72/02 370/329
12,513,688 B2 * 12/2025 Zhang ................... H04L 5/0037

(Continued)

FOREIGN PATENT DOCUMENTS

CN 112235765 A 1/2021
CN 112840586 A 5/2021
EP 4271072 A1 * 11/2023 ........... H04W 72/25

OTHER PUBLICATIONS

ISA State Intellectual Property Office of the People's Republic of China, International Search Report Issued in Application No. PCT/CN2022/097605, Aug. 25, 2022, WIPO, 7 pages.

(Continued)

*Primary Examiner* — Anthony Mejia

(57) ABSTRACT

Provided in the embodiments of the present disclosure are a resource conflict indication method, and a terminal, an apparatus and a storage medium. The method includes receiving a first SCI that is sent by a second terminal; determining resource conflict information according to the first SCI, and the resource conflict information is used for indicating whether there is a resource conflict between resources indicated by the first SCI; and sending the resource conflict information to the second terminal. By means of the embodiments of the present disclosure, the probability of a data packet transmission failure caused by a resource collision occurring can be effectively reduced, to improve the transmission success rate of a sidelink data packet.

16 Claims, 6 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0075603 | A1 | 3/2019 | Hong et al. | |
| 2020/0344808 | A1 | 10/2020 | Ku et al. | |
| 2023/0037493 | A1* | 2/2023 | Wu | H04W 74/0825 |
| 2024/0163903 | A1* | 5/2024 | Sun | H04W 72/0446 |

OTHER PUBLICATIONS

ISA State Intellectual Property Office of the People's Republic of China, written opinion Issued in Application No. PCT/CN2022/097605, Aug. 25, 2022, WIPO, 4 pages.
LG Electronics "Discussion on inter-UE coordination for Mode 2 enhancements", 3GPP TSG RAN WG1 Meeting #104bis-e, e-Meeting, Apr. 12-20, 2021, total 25 pages, R1-2103379.
Apple, "On Inter-UE Coordination", 3GPP TSG RAN WG1 #105-e, e-Meeting, May 10-27, 2021, total 12 pages, R1-2105127.

* cited by examiner

RESOURCE CONFLICT INDICATION METHOD, AND TERMINAL, APPARATUS AND STORAGE MEDIUM

CROSS-REFERENCE TO RELATED APPLICATION

The present application is a National Stage of International Application No. PCT/CN2022/097605, filed on Jun. 8, 2022, which claims priority to Chinese patent application No. 202110897537.2 filed on Aug. 5, 2021, entitled "Resource Conflict Indication Method, and Terminal, Apparatus and Storage Medium", which are hereby incorporated by reference in their entireties.

FIELD

The present application relates to the field of communication, and particular to resource conflict indication methods, terminals, apparatuses and a storage medium.

BACKGROUND

In new radio (NR) vehicle to everything (V2X) system, terminals communicate directly with each other through a sidelink. Before service data transmission, it is necessary to first determine a time-frequency resource used for sidelink data transmission, and the main criterion for determining the time-frequency resource is to avoid a collision between time-frequency resources used by different terminals to avoid mutual interference.

However, currently no better optimization to avoid the collision between time-frequency resources used by different terminals is in the prior art.

SUMMARY

The embodiments of the present application provide resource conflict indication methods, terminals, apparatuses, and a storage medium to avoid the collision between time-frequency resources used by different terminals in the prior art, which may reduce the failure rate of data packet transmission caused by resource collision and improve the success rate of sidelink data packet transmission.

An embodiment of the present application provides a resource conflict indication method, applied to a first terminal, including:

- receiving first sidelink control information (SCI) transmitted from a second terminal;
- determining resource conflict information based on the first SCI, where the resource conflict information is configured to indicate whether a resource conflict occurs on a resource indicated by the first SCI; and
- transmitting the resource conflict information to the second terminal.

In an embodiment, the resource conflict information includes at least one of the following: reference signal receiving power (RSRP) threshold information, where the RSRP threshold information includes an RSRP threshold value for determining the resource conflict;

- priority information, where the priority information includes a priority identifier of a data packet with resource conflict;
- zone identifier information, where the zone identifier information includes a grid identifier for a geographic location of the first terminal; or
- resource conflict type information, where the resource conflict type information includes a type identifier for representing a type of the resource conflict.

In an embodiment, the data packet is a data packet transmitted through the resource indicated by the first SCI.

In an embodiment, an information length occupied by the type identifier is 1 bit; the type of the resource conflict includes a potential resource conflict or a detected resource conflict.

In an embodiment, the information length occupied by the type identifier is 2 bits; the type of the resource conflict includes any one of the following:

- no resource conflict;
- existence of a potential resource conflict;
- existence of a detected resource conflict; and
- existence of the potential resource conflict and the detected resource conflict.

In an embodiment, transmitting the resource conflict information to the second terminal includes: determining one or more types of signaling configured to carry the resource conflict information; and transmitting the resource conflict information to the second terminal through the one or more types of signaling.

In an embodiment, the one or more types of signaling include: a second SCI and/or a radio resource control (RRC) signaling.

An embodiment of the present application provides a resource conflict indication method, applied to a second terminal, including:

- receiving resource conflict information transmitted from a first terminal, where the resource conflict information is determined by the first terminal based on first sidelink control information (SCI) transmitted from the second terminal, and the resource conflict information is configured to indicate whether a resource conflict occurs on a resource indicated by the first SCI; and
- determining whether the resource conflict occurs on the resource indicated by the first SCI based on the resource conflict information.

In an embodiment, the resource conflict information includes reference signal received power (RSRP) threshold information, and the RSRP threshold information includes an RSRP threshold value for determining the resource conflict;

the method further includes:

- in case that it is determined that the resource conflict occurs on the resource indicated by the first SCI, obtaining the RSRP threshold value for determining the resource conflict; and
- in case that the RSRP threshold value meets a specified threshold condition, replacing the resource indicated by the first SCI.

In an embodiment, the resource conflict information includes priority information, and the priority information includes a priority identifier of a data packet with resource conflict;

the method further includes:

- in case that it is determined that the resource conflict occurs on the resource indicated by the first SCI, determining a priority of the data packet with resource conflict based on the priority identifier; and
- in case that the priority of the data packet meets a specified priority condition, replacing the resource indicated by the first SCI.

In an embodiment, the data packet is a data packet transmitted through the resource indicated by the first SCI.

In an embodiment, the resource conflict information includes zone identifier information, where the zone identifier information includes a grid identifier for a geographic location of the first terminal;

the method further includes:

in case that it is determined that the resource conflict occurs on the resource indicated by the first SCI, determining a distance between the first terminal and the second terminal based on the grid identifier for the geographic location; and in case that the distance meets a specified distance condition, replacing the resource indicated by the first SCI.

In an embodiment, the resource conflict information includes resource conflict type information, and the resource conflict type information includes a type identifier for representing a type of the resource conflict;

the method further includes:

in case that it is determined that the resource conflict occurs on the resource indicated by the first SCI, determining the type of the resource conflict based on the type identifier; and replacing the resource indicated by the first SCI based on the type of the resource conflict.

In an embodiment, an information length occupied by the type identifier is 1 bit; the type of the resource conflict includes a potential resource conflict or a detected resource conflict.

In an embodiment, the information length occupied by the type identifier is 2 bits; the type of the resource conflict includes any one of the following:

no resource conflict;

existence of a potential resource conflict;

existence of a detected resource conflict; and existence of the potential resource conflict and the detected resource conflict.

In an embodiment, the receiving the resource conflict information transmitted from the first terminal includes:

receiving the resource conflict information transmitted from the first terminal through one or more types of signaling; and the one or more types of signaling include a second SCI and/or a radio resource control (RRC) signaling.

An embodiment of the present application provides a first terminal, including a memory, a transceiver, and a processor:

the memory is configured to store a computer program; the transceiver is configured to receive and transmit data under control of the processor; the processor is configured to read the computer program stored in the memory and implement the steps of the resource conflict indication method applied to the first terminal as described above.

An embodiment of the present application provides a second terminal, including a memory, a transceiver, and a processor:

the memory is configured to store a computer program; the transceiver is configured to receive and transmit data under control of the processor; the processor is configured to read the computer program stored in the memory and implement the steps of the resource conflict indication method applied to the second terminal as described above.

An embodiment of the present application provides a resource conflict indication apparatus, applied to a first terminal, including:

a sidelink control information (SCI) receiving device, configured to receive first SCI transmitted from a second terminal;

an information determining device, configured to determine resource conflict information based on the first SCI, where the resource conflict information is configured to indicate whether a resource conflict occurs on a resource indicated by the first SCI; and an information transmitting device, configured to transmit the resource conflict information to the second terminal.

An embodiment of the present application provides a resource conflict indication apparatus applied, to a second terminal, including:

an information receiving device, configured to receive resource conflict information transmitted from a first terminal, the resource conflict information is determined by the first terminal based on first sidelink control information (SCI) transmitted from the second terminal, and the resource conflict information is configured to indicate whether a resource conflict occurs on a resource indicated by the first SCI; and a resource conflict determining device, configured to determine whether the resource conflict occurs on the resource indicated by the first SCI based on the resource conflict information.

An embodiment of the present application provides a processor readable storage medium, where the processor readable storage medium stores a computer program that causes, when executed by a processor, the processor to perform the steps of the resource conflict indication method applied to the first terminal as described above.

An embodiment of the present application provides a processor readable storage medium, where the processor readable storage medium stores a computer program that causes, when executed by a processor, the processor to perform the steps of the resource conflict indication method applied to the second terminal as described above.

In the resource conflict indication methods, terminals, apparatuses and the storage medium provided in the embodiments of the present application, by receiving the first SCI transmitted from the second terminal, determining resource conflict information based on the first SCI, where the resource conflict information is configured to indicate whether a resource conflict occurred in the resource indicated by the first SCI, and transmitting the resource conflict information to the second terminal, the probability of data packet transmission failure caused by resource collision may be effectively reduced and the success rate of sidelink data packet transmission may be improved.

BRIEF DESCRIPTION OF THE DRAWINGS

To provide a clearer explanation for the embodiments of the present application, a brief description is given to the accompanying drawings required in the description of the embodiments. The accompanying drawings in the following description are some embodiments of the present application.

DETAILED DESCRIPTION

Figure 1:
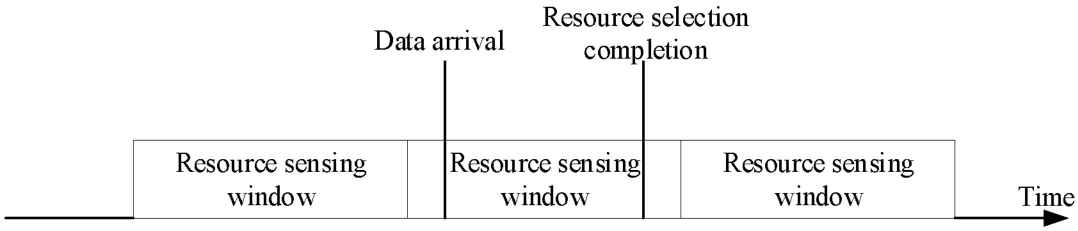
FIG. 1 is a schematic diagram of resource sensing and resource selection.

In the embodiments of the present application, the term "and/or" describes the association relationship of the associated objects, indicating three types of relationships. For example, A and/or B may represent three situations: A exists alone, A and B exist simultaneously, and B exists alone. The character "/" generally indicates that the associated objects are in an "or" relationship The term "multiple" in the embodiments of the present application refers to two or more, similar to other quantifiers.

The following provides a clear and complete description for the embodiments of the present application, in conjunction with the accompanying drawings. The described embodiments are only part of the embodiments of the present application and not all of them.

In new radio (NR) vehicle to everything (V2X) system, the terminals communicate directly with each other through a sidelink. Before service data transmission, it is necessary to first determine a time-frequency resource used for sidelink data transmission, and the main criterion for determining the time-frequency resource is to avoid a collision between time-frequency resources used by different terminals to avoid mutual interference. Two resource scheduling modes are in NR V2X: the first resource scheduling mode is a unified scheduling for the time-frequency resource used in sidelink communication between terminals by a base station; and the second resource scheduling mode is that the terminal autonomously selects the time-frequency resource used in sidelink communication between terminals without the participation of the base station.

The second resource scheduling mode adopts distributed resource scheduling. Due to the lack of unified scheduling by the base station, the terminal needs to determine resource occupancy of other terminals through a resource sensing mechanism and selects resources based on a resource sensing result. Compared to a completely random resource selection mechanism, the resource sensing mechanism may improve resource utilization, reduce collision probability, and enhance system performance.

The steps of the second resource scheduling mode may include:

(1) resource sensing: resource sensing refers to determining, by a terminal, whether a resource is being used by other terminals based on a strength of a reference signal receiving power (RSRP) of the received signal over that resource. In resource sensing procedure, it is necessary to consider different characteristics of periodic and aperiodic services in mixed service scenarios in NR V2X applications, as well as the impact of service types on resource sensing results. It is also necessary to perform an appropriate resource sensing configuration based on information such as time-frequency resource granularity and resource pool setting in a physical channel. A resource sensing window refers to a time window during which the terminal performs resource sensing.

(2) resource exclusion: the main purpose of resource exclusion is to exclude resources not available for resource selection within the resource selection window based on the sensing result, such as excluding time-frequency resources occupied by the terminal for receiving data (NR V2X terminals transmit and receive data in half duplex mode, which means the terminal cannot transmit and receive data simultaneously), forming a candidate resource set, reducing the probability of resource collision, and improving reliability.

(3) resource selection: the resource selection mechanism is to select appropriate time-frequency resources for transmitting the service data packet transport block (TB) from the candidate resource set, taking into account the priority of the service, delay, service data packet size, and transmission reliability requirements in resource selection. The resource selection window refers to a time window during which the terminal selects resources.

When the service arrives, the terminal receives the data packet within the resource sensing window and decodes sidelink control information (SCI), resources that fall within the resource selection window and have the RSRP greater than the RSRP threshold need to be excluded, and the remaining resources are candidate resources. Then, the terminal randomly selects the resources required for sidelink transmission from 20% of candidate resources with a minimum received signal strength indication(RSSI), or directly select the resources required for sidelink transmission from all candidate resources. A length of the resource selection window may be configured as a maximum cycle of the service.

FIG. 1 is a schematic diagram of resource sensing and resource selection. As shown in FIG. 1, before the terminal transmits data through the sidelink, the terminal first performs resource sensing and selects resources based on the result of resource sensing. This mechanism may to some extent avoid collisions. When the terminal selects resources, the terminal may exclude the sensed conflicting resource.

In the second resource scheduling mode, the terminal may exclude resources based on its own resource sensing result, that is, exclude the conflicting resource sensed by the terminal itself. However, in addition to the conflicting resource that the terminal itself may sense, the terminal also needs to obtain other conflicting resource from coordination information transmitted from other terminals. The terminal also needs to exclude these conflicting resource from the coordination information between terminals. When the terminal excludes resources from the coordination information transmitted from other terminals, the terminal needs to obtain some useful information to efficiently exclude resources. Thus, how to transfer information of conflicting resource in the coordination information between terminals and effectively assist the terminal in resource exclusion, is a key resource coordination problem that needs to be solved. In addition, it is necessary to consider signaling overhead involved in coordinating information transmission to avoid introducing excessive signaling overhead.

The embodiments of the present application propose resource conflict indication methods, terminals, apparatuses and a storage medium, which transfer resource conflict information between terminals. Terminal A transmits, to the terminal B, association information on whether a resource conflict occurs in the resource indicated by the SCI of the terminal B, which allows the terminal B to consider the resource conflict during a resource selection process, reducing the probability of data packet transmission failure caused by resource collision, and improving the success rate of sidelink data packet transmission.

The method and apparatus are based on the same application concept. As the principles of solving problems by the method and apparatus are similar, the implementation of the apparatus and method may refer to each other, and the repetition is omitted.

The solutions according to the embodiments of the present application may be applicable to various systems, especially to 5th generation (5G) systems. For example, the applicable systems may be a global system of mobile communication (GSM) system, a code division multiple access (CDMA) system, a wideband code division multiple access (WCDMA) general data packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. These various systems include a terminal and a network device, and may further include a core network part, such as an evolved data packet system (EPS), a 5G system (5GS), and the like.

The terminal device in the embodiments of the present application may be a device that provides voice and/or data connectivity to a user, a handheld device with a wireless connection function, or other processing devices connected to a wireless modem. In different systems, the names of the terminal may be different. For example, in the 5G system, the terminal may be called as a user equipment (UE). A wireless terminal device may communicate with one or more core networks (CNs) via a radio access network (RAN), and the wireless terminal may be a mobile terminal device, such as a mobile phone (or cellular phone) and a computer with mobile terminal device, e.g., a portable mobile device, a pocket-sized mobile device, a handheld mobile device, a computer-built mobile device or a vehicle-mounted mobile device, which exchange language and/or data with the radio access network. For example, personal communication service (PCS) phones, cordless phones, session initiated protocol (SIP) phones, wireless local loop (WLL) stations, personal digital assistant (PDA) and other devices. A wireless terminal device may also be called a system, a subscriber unit, a subscriber station, a mobile station, a mobile platform, a remote station, an access point, a remote terminal, an access terminal, a user terminal, a user agent, or a user device, which is not limited in the embodiments of the present application.

The network device in the embodiments of the present application may be a base station, and the base station may include multiple cells providing services for the terminal. Depending on the specific scenario, the base station may be called an access point, or a device communicating with a wireless terminal device through one or more sectors on the air interface in the access network, or other names. The network device may be used for exchanging received air frames with internet protocol (IP) data packets, and acting as a router between the wireless terminal device and the rest of the access network, where the rest of the access network may include an IP communication network. The network device may also coordinate attribute management for the air interface. For example, the network device in the embodiments of the present application may be a base transceiver station (BTS) in a global system for mobile communications (GSM) or a code division multiple access (CDMA), or may be a node B in a wide-band code division multiple access (WCDMA), or may be an evolutional NodeB (eNB or e-Node B) in a long term evolution (LTE) system, or may be a 5G gNB in 5G network architecture (next generation system), or may be a home evolved node B (HeNB), a relay node, a femto, or a pico, etc., which is not limited in the embodiments of the present application. In some network structures, the network device may include a centralized unit (CU) node and a distributed unit (DU) node, and the centralized unit and the distributed unit may be geographically separated.

A multi-input multi-output (MIMO) transmission may be performed between the network device and the terminal by using one or more antennas. The MIMO transmission may be single-user MIMO (SU-MIMO) or multi-user MIMO (MU-MIMO). Depending on the form and number of antenna combinations, MIMO transmission may be 2D-MIMO, 3D-MIMO, FD-MIMO or massive-MIMO, and may also be diversity transmission, precoding transmission, beamforming transmission, etc.

Figure 2:
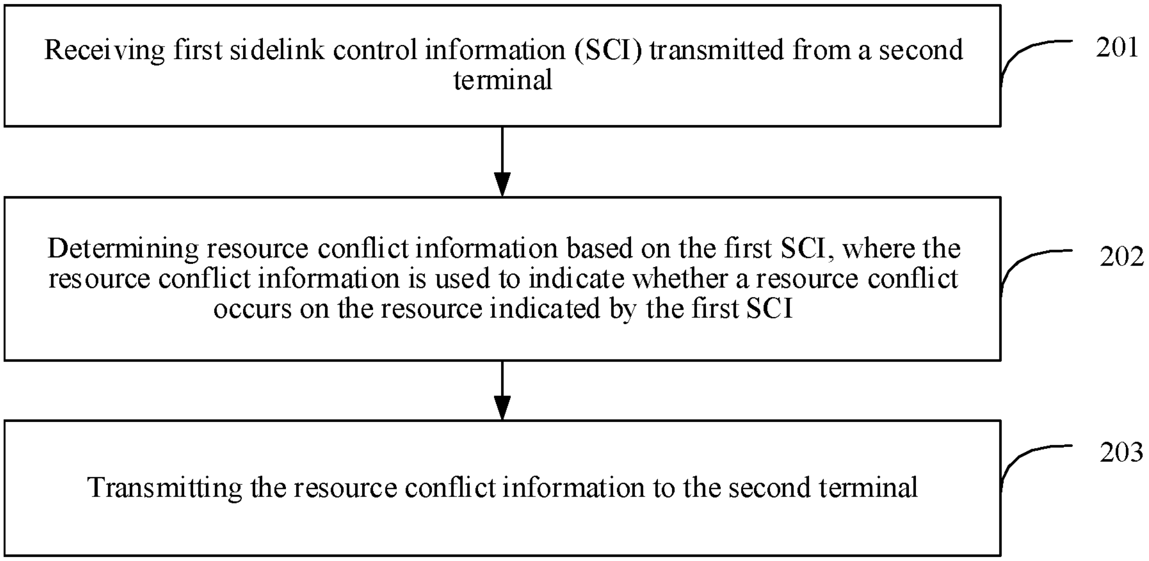
FIG. 2 is a first schematic flow diagram of a resource conflict indication method according to an embodiment of the present application.

FIG. 2 is a first schematic flow diagram of a resource conflict indication method according to an embodiment of the present application, and the method may be applied to a first terminal. For example, the first terminal is terminal A, and a second terminal is terminal B. Terminal A may communicate directly with terminal B through a sidelink. As shown in FIG. 2, the resource conflict indication method may include the following steps.

Step 201, receiving first sidelink control information (SCI) transmitted from a second terminal.

In an embodiment, when the first terminal communicates with the second terminal through a sidelink, the first terminal may receive the first SCI transmitted from the second terminal. For example, the terminal B transmits the first SCI on slot 2 of subchannel 1, and the terminal A monitors the first SCI transmitted from the terminal B on slot 5 of subchannel 4.

Step 202, determining resource conflict information based on the first SCI, where the resource conflict information is configured to indicate whether a resource conflict occurs on the resource indicated by the first SCI.

In an embodiment, the resource indicated by the first SCI may be one or more. For example, the first SCI transmitted from the terminal B indicates that the resource on slot 6 of subchannel 2 will be used by the terminal B to transmit data, in case that the resource on slot 6 of subchannel 2 is still being used by other terminals, it is indicated that a resource conflict occurs; in case that the resource on slot 6 of subchannel 2 is not being used by other terminals, it is indicated that no resource conflict occurs.

It is noted that the resource in the embodiments of the present application may refer to a time-frequency resource set indicated by the first SCI transmitted from the second terminal, and the resource may be one or more subchannels, where a subchannel is a frequency domain unit for sidelink resource allocation, and a subchannel is composed of one or more continuous physical resource blocks (PRBs) in frequency domain. The resource conflict in the embodiments of the present application may refer to one or more subchannels being used by two terminals simultaneously.

Step 203: transmitting the resource conflict information to the second terminal.

After the first terminal determines the resource conflict information, the first terminal transmits the resource conflict information configured to indicate whether a resource conflict occurs on the resource indicated by the first SCI to the second terminal. For example, when the terminal A and the terminal B communicate through the sidelink, after the terminal A receives the first SCI transmitted from the terminal B, the terminal A may transmit the resource conflict information configured to indicate whether a resource conflict occurs on the resource indicated by the first SCI to the terminal B. Thus, the terminal B may determine whether a resource conflict occurs on the resource indicated by the first SCI based on the resource conflict information when selecting resource, to avoid the conflicted resource.

In the above embodiments, by receiving the first SCI transmitted from the second terminal, determining resource conflict information based on the first SCI, where the resource conflict information is configured to indicate whether a resource conflict occurs on the resource indicated by the first SCI, and transmitting resource conflict information to the second terminal, the second terminal may determine whether a resource conflict occurs on the resource indicated by the first SCI based on the resource conflict information when selecting resource, the probability of data packet transmission failure caused by resource collision may be effectively reduced and the success rate of sidelink data packet transmission may be improved.

In an embodiment, the resource conflict information in step 202 may include at least one of the following:

- RSRP threshold information, where the RSRP threshold information includes an RSRP threshold value configured to determine a resource conflict;
- priority information, where the priority information includes a priority identifier of a data packet with resource conflict;
- zone identifier information, where the zone identifier information includes a grid identifier for a geographic location of the first terminal; or
- resource conflict type information, where the resource conflict type information includes a type identifier for representing a type of the resource conflict.

In an embodiment, the resource the conflict information may include, but not limited to, at least one of the following.

(1) RSRP threshold information, where the RSRP threshold information includes an RSRP threshold value configured to determine a resource conflict.

The RSRP threshold value is configured to determine whether the resource indicated by the first SCI is a conflicting resource (i.e., whether a resource conflict occurs), that is: in case that the RSRP of a conflicting resource of the second terminal received by the first terminal exceeds the RSRP threshold, it is considered that the conflicting resource interferes (i.e., a resource conflict occurs); on the contrary, if the RSRP of a conflicting resource of the second terminal received by the first terminal is lower than the RSRP threshold, it is considered that the conflicting resource does not interfere (i.e., no resource conflict occurs). The configuration modes for RSRP threshold information may include but not limited to the following: a. the RSRP threshold information is carried by the resource conflict information; b. the RSRP threshold information is configured by other signals, which may be a radio resource control (RRC) signaling; c. the RSRP threshold is pre-configured.

Taking the communication between the terminal A and the terminal B through the sidelink as an example to describe the above RSRP threshold information.

After the terminal A receives a data packet transmitted from the terminal B, the terminal A first determines whether a resource conflict occurs based on the RSRP threshold value; if the RSRP threshold value of the data packet is −65 dBm, and in case that the RSRP value of the data packet received by terminal A exceeds −65 dBm and the data packet occupies the same time-frequency resource as the data packet transmitted from other terminals, it is indicated that a resource conflict occurs. Then the terminal A transmits the resource conflict information and the RSRP threshold value to the terminal B. In this way, after the terminal B receives the resource conflict information and the RSRP threshold value transmitted from the terminal A, the terminal B evaluates whether to replace the transmission resource and how to replace conflicting resource based on the resource conflict information fed back from the terminal A. For example, higher RSRP threshold value fed back from the terminal A indicates more severe conflict, and the terminal B needs to immediately replace the transmission resource to avoid subsequent resource conflict. Lower RSRP threshold value fed back from the terminal A indicates lighter conflict, and the terminal B may not replace the resource, but instead retransmit on the existing resource, and expects the terminal A to receive and merge two transmitted data packets to obtain retransmission gain and eliminate the impact of the resource conflict.

It may be seen that by including RSRP threshold information in resource conflict information, the terminal B may have more information to determine the severity of the resource conflict during resource selection, to reduce the probability of data packet transmission failure caused by resource collision, and improving the success rate of sidelink data packet transmission.

(2) Priority information, where the priority information includes a priority identifier of a data packet configured to determine resource conflict.

The second terminal may determine a next resource selection process based on the priority information of the data packet.

Taking the communication between the terminal A and the terminal B through the sidelink as an example to describe the above priority information.

The terminal A not only transmits resource conflict information to the terminal B, but also transmits priority information of the data packet with resource conflict to the terminal B in the same time. The priority information is the transmission priority of the data packet, the higher the priority, the more important the data packet is, and it is necessary to ensure the success rate and low latency of transmission of the data packet with high priority. After the terminal B receives the resource conflict information and priority information transmitted from the terminal A, the terminal B determines whether to replace the transmission resource and how to replace the transmission resource based on the priority information. In case that the priority of the conflicting data packet is high, the terminal B immediately replaces the transmission resource to ensure the success rate and low latency of the data packet transmission. In case that the priority of the conflicting data packet is low, the terminal B may not replace the transmission resource, but instead promote the successful reception of the data packet through the retransmission gain after multiple retransmissions.

(3) Zone identifier (ID) information, where the zone identifier information includes a grid identifier for a geographic location of the first terminal.

The zone ID information is an ID of the geographic grid where the first terminal is located. While reporting the resource conflict information, the first terminal also reports a direct zone ID, which helps the second terminal determine the next resource selection process based on the zone ID.

Taking the communication between the terminal A and the terminal B through a sidelink as an example to describe the above zone identifier information.

Figure 3:
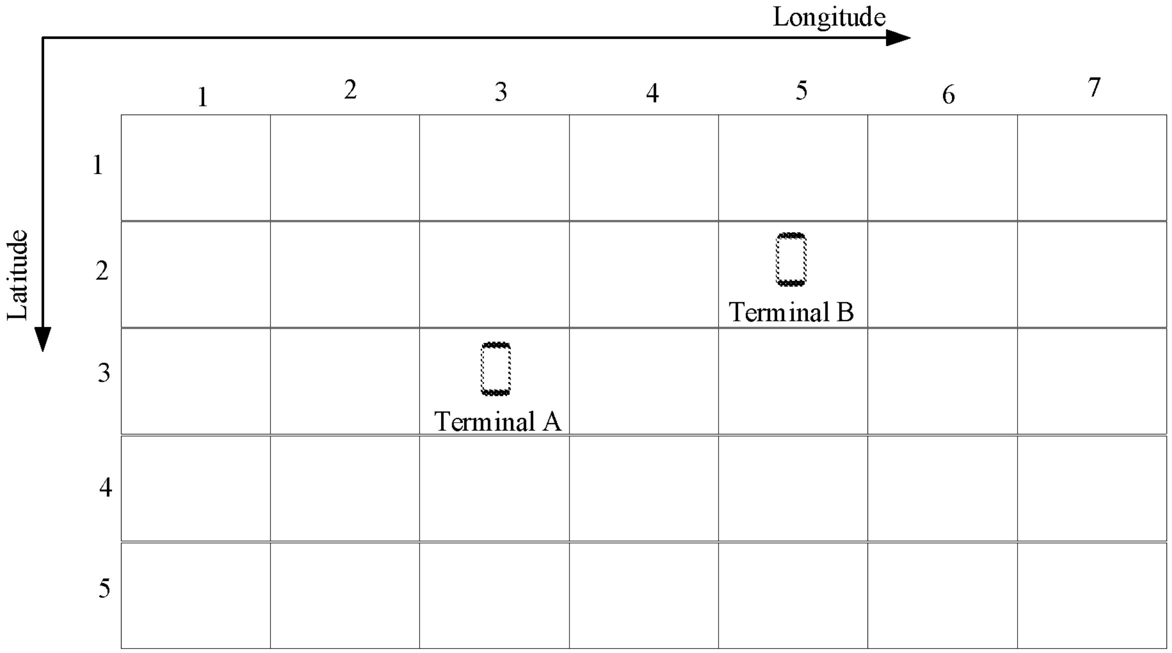
FIG. 3 is a schematic diagram of zone identifier information according to an embodiment of the present application.

FIG. 3 is a schematic diagram of the zone identifier information according to an embodiment of the present application. As shown in FIG. 3, if the terminal B receives the zone ID of terminal A, then the terminal B calculates a distance between the terminal A and the terminal B based on the zone ID of the terminal B, and the terminal B may determine the severity of the resource conflict based on the distance. A short distance between the terminal A and the terminal B indicates that the resource conflict is relatively severe, and the terminal B immediately replaces the transmission resource to avoid further interference; a long distance between the terminal A and the terminal B indicates that the resource conflict is relatively light, and the terminal B does not immediately replace the transmission resource but wait for further information.

It may be seen that by including the priority information and the zone identifier information in the resource conflict information, the terminal B may have more information to determine the severity of the resource conflict during resource selection, to reduce the probability of data packet transmission failure caused by resource collisions, and improving the success rate of sidelink data packet transmission.

(4) Resource conflict type information, where the resource conflict type information includes a type identifier for representing a type of the resource conflict.

The type of the resource conflict may include but not limited to the following: a potential resource conflict and a detected resource conflict. The potential resource conflict may refer to resource conflict that have not occurred, that is, a first terminal transmits resource conflict information to a second terminal before the resource conflict occurs. The detected resource conflict may refer to the resource conflict that has already occurred, that is, the first terminal transmits the resource conflict information to the second terminal after the resource conflict occurs.

Taking the communication between the terminal A, the terminal B and a terminal C through the sidelink as an example to describe the above potential resource conflict.

Figure 4:
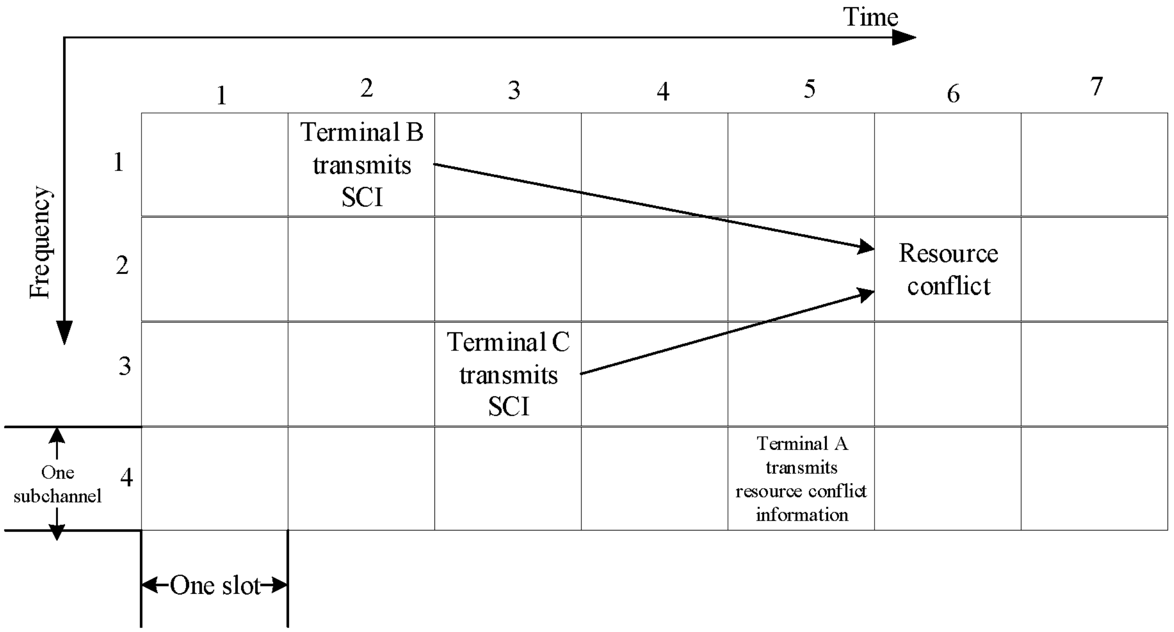
FIG. 4 is a schematic diagram of a potential resource conflict according to an embodiment of the present application.

FIG. 4 is a schematic diagram of a potential resource conflict according to the embodiments of the present application. As shown in FIG. 4, the terminal B transmits SCI on slot 2 of subchannel 1, and the terminal C transmits SCI on slot 3 of subchannel 3. Both SCI indicate that the resource on slot 6 of subchannel 2 will be used by the terminal B and the terminal C respectively to transmit data, resulting in resource conflict. And the terminal A detects the SCI transmitted from the terminal B and the terminal C on slot 5, and learns about the resource conflict information. Therefore, the terminal A transmits the resource conflict information to the terminal B on slot 5, and the terminal B will replace the transmission resource to avoid resource conflict. Since the terminal A transmitting resource conflict information to the terminal B before the resource conflict occurs, this is the potential resource conflict.

It may be seen that the terminal A transmits, to the terminal B, association information on whether a resource conflict occurs on the resource indicated by the SCI of the terminal B before resource conflict occurs, allowing the terminal B to re-select resource, avoiding conflicting resource, reducing the probability of data packet transmission failure caused by the resource collision, and improving the success rate of sidelink data packet transmission.

Taking the communication between the terminal A, the terminal B and the terminal C through the sidelink as an example to describe the above detected resource conflict.

Figure 5:
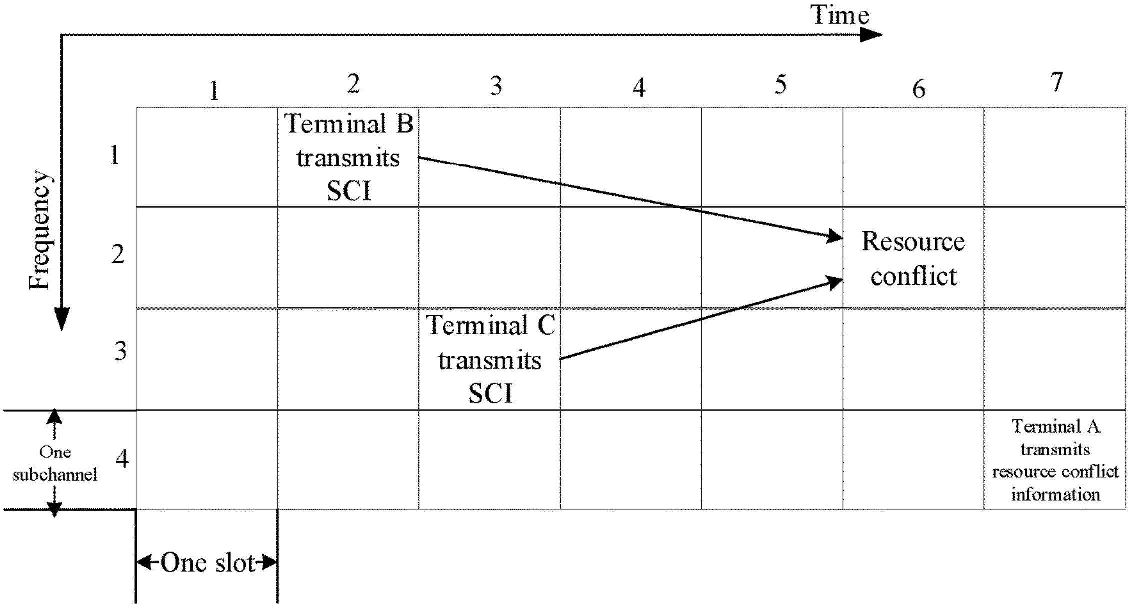
FIG. 5 is a schematic diagram of a detected resource conflict according to an embodiment of the present application.

FIG. 5 is a schematic diagram of a detected resource conflict according to an embodiment of the present application. As shown in FIG. 5, the terminal B transmits SCI on slot 2 of subchannel 1, and terminal C transmits SCI on slot 3 of subchannel 3. Both SCI indicate that the resource on slot 6 of subchannel 2 will be used by terminal B and terminal C respectively to transmit data, resulting in resource conflict. And terminal A only detected the SCI transmitted from the terminal B and terminal C on slot 7, and learned about the resource conflict information. Therefore, the terminal A transmits the resource conflict information to the terminal B and terminal C on slot 7, and terminal B and terminal C will replace the transmission resources and retransmit the data separately. Since terminal A transmits resource conflict information to the terminal B after a resource conflict occurs, this is a detected resource conflict.

It may be seen that terminal A only transmits association information on whether the resource indicated by the SCI of terminal B have resource conflict to the terminal B and terminal C after resource conflict occur, allowing terminal B and terminal C to retransmit, avoiding conflicting resource, reducing the probability of data packet transmission failure caused by resource collisions, and improving the success rate of sidelink data packet transmission.

As may be seen from the above embodiments, resource conflict information may not only indicate whether the resource conflict occurs on the resource indicated by the first SCI transmitted from the second terminal, but also include RSRP threshold information, priority information, zone identifier information, and resource conflict type information, and the second terminal has more information when selecting resource to determine the severity of the resource conflict, which reduces the probability of data packet transmission failure caused by resource collisions and improves the success rate of sidelink data packet transmission.

In an embodiment, the data packet configured to determine resource conflict is the data packet transmitted by the resource indicated by the first SCI.

In an embodiment, the priority identifier of the data packet included in the priority information for determining resource conflict may be the priority identifier of the data packet transmitted by the resource indicated by the first SCI. The second terminal may determine the next resource selection process based on the priority information of the data packet. For example: in case that the priority of the conflicting data packet is higher, the second terminal immediately replaces the transmission resource to ensure the success rate and low latency of the data packet transmission; in case that the priority of the conflicting data packet is lower, the second terminal may not replace the transmission resource, but instead promote the successful reception of the data packet through the retransmission gain after multiple retransmissions.

As may be seen from the above embodiments, by including the priority information in the resource conflict information, the second terminal may have more information to determine the severity of the resource conflict when selecting resource, to reduce the probability of data packet transmission failure caused by resource collisions, and improving the success rate of sidelink data packet transmission.

In an embodiment, an information length occupied by the type identifier for representing the type of the resource conflict is 1 bit; the type of the resource conflict includes a potential resource conflict or a detected resource conflict.

In an embodiment, 1 bit may be configured to indicate the type of the resource conflict present in the current resource conflict information. For example: 0 indicates that the resource conflict type is a potential resource conflict, and 1 indicates that the resource conflict type is a detected resource conflict. For another example: 0 indicates that the resource conflict type is a detected resource conflict, and 1 indicates that the resource conflict type is a potential resource conflict.

The type of the resource conflict includes the potential resource conflict or the detected resource conflict. The potential resource conflict refers to the first terminal transmitting resource conflict information to the second terminal before the resource conflict occurs; the detected resource conflict refers to the first terminal transmitting resource conflict information to the second terminal after the resource conflict occurs.

As may be seen from the above embodiments, by setting the length of information occupied by the type identifier to 1 bit, signaling overhead is saved.

In an embodiment, the information length occupied by the type identifier for representing the type of the resource conflict is 2 bits; the type of the resource conflict includes any one of the following:

no resource conflict;

existence of a potential resource conflict;

existence of a detected resource conflict; and existence of the potential resource conflict and the detected resource conflict.

In an embodiment, 2 bits may be configured to indicate the type of the resource conflict present in the current resource conflict information. For example: 00, 01, 10, and 11 respectively indicate that no resource conflict, existence of the potential resource conflict, existence of the detected resource conflict, existence of the potential resource conflict and the detected resource conflict. For another example: 00, 01, 10, and 11 respectively indicate that no resource conflict, existence of the detected resource conflict, existence of the potential resource conflict, existence of the potential resource conflict and the detected resource conflict.

As may be seen from the above embodiments, by setting the length of information occupied by type identifier to 2 bits, the type indication mode is enriched and the signaling overhead are saved.

In an embodiment, when transmitting resource conflict information to the second terminal in step 203, the method may include:

determining one or more types of signaling configured to carry the resource conflict information; and transmitting the resource conflict information to the second terminal through one or more types of signaling.

In an embodiment, the first terminal may transmit the resource conflict information to the second terminal through a signaling such as RRC; and the first terminal may also transmit the resource conflict information to the second terminal through two types of signals, such as a second SCI and the RRC signaling.

As may be seen from the above embodiments, transmitting the resource conflict information to the second terminal through one or more types of signaling enriches the implementation methods of the resource conflict information transmission and improves the efficiency of the resource conflict indication.

In an embodiment, one or more types of signaling configured to carry resource conflict information include: a second SCI and/or an RRC signaling.

In an embodiment, if resource conflict information is transmitted from the first terminal to the second terminal through a sidelink, then the resource conflict information may be carried by the second SCI and/or the RRC signaling.

As may be seen from the above embodiments, the resource conflict information is transmitted to the second terminal through the second SCI and/or the RRC signaling, to improve the efficiency of the resource conflict information transmission.

Figure 6:
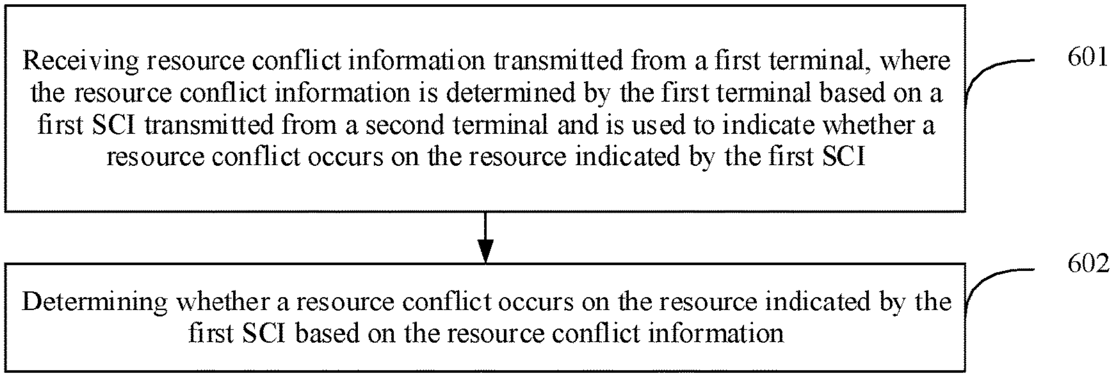
FIG. 6 is a second schematic flow diagram of a resource conflict indication method according to an embodiment of the present application.

FIG. 6 is a second schematic flow diagram of a resource conflict indication method according to an embodiment of the present application, and the method may be applied to a second terminal. For example, the first terminal is terminal A, and a second terminal is terminal B. Terminal A may communicate directly with terminal B through a sidelink. As shown in FIG. 6, the resource conflict indication method may include the following steps.

Step 601: receiving resource conflict information transmitted from a first terminal, where the resource conflict information is determined by the first terminal based on a first SCI transmitted from a second terminal and is configured to indicate whether a resource conflict occurs on the resource indicated by the first SCI.

In an embodiment, when the first terminal communicates with the second terminal through a sidelink, the second terminal may transmit the first SCI to the first terminal. After the first terminal receives the first SCI transmitted from the second terminal, the first terminal determines resource conflict information based on the first SCI, the resource conflict information is configured to indicate whether a resource conflict occurs on the resource indicated by the first SCI, and transmit the resource conflict information to the second terminal.

Step 602: determining whether a resource conflict occurs on the resource indicated by the first SCI based on the resource conflict information.

In an embodiment, the second terminal may determine whether a resource conflict occurs on the resource indicated by the first SCI based on the resource conflict information, to avoid conflicting resource.

It is noted that the resource in the embodiments of the present application may refer to a time-frequency resource set indicated by the first SCI transmitted from the second terminal, and the resources may be one or more subchannels; and a subchannel is a frequency domain unit for sidelink resource allocation, and a subchannel is composed of one or more continuous PRBs in the frequency domain. The resource conflict in the embodiments of the present application may refer to one or more subchannels being used by two terminals simultaneously.

As may be seen from the above embodiments, transmitting association information on whether a resource conflict occurs on the resource indicated by the first SCI of the second terminal from the first terminal to the second terminal allows the second terminal to consider the issue of the resource conflict in the resource selection process, which reduces the probability of data packet transmission failure caused by resource collisions, and improves the success rate of sidelink data packet transmission.

In an embodiment, the resource conflict information includes RSRP threshold information, and the RSRP threshold information includes an RSRP threshold value configured to determine resource conflict;

the resource conflict indication method further includes:

in case that it is determined that a resource conflict occurs on the resource indicated by the first SCI, obtaining the RSRP threshold value for determining the resource conflict; and in case that the RSRP threshold value meets a specified threshold condition, replacing the resource indicated by the first SCI.

In an embodiment, the first terminal receives the first SCI transmitted from the second terminal, and the first terminal, based on the resource information indicated in the first SCI, transmits association information to the second terminal on whether a resource conflict occurs in the resource indicated by the first SC. The resource conflict information indicated by the first SCI includes RSRP threshold information.

The RSRP threshold is configured to determine whether the resource indicated by the first SCI is a conflicting resource. That is, if the RSRP of a conflicting resource of the second terminal received by the first terminal exceeds the RSRP threshold, it is considered that the conflicting resource interferes, and resource conflict information needs to be transmitted to the second terminal; on the contrary, if the RSRP of a conflicting resource of the second terminal received by the first terminal is lower than the RSRP threshold, it is considered that the conflicting resource does not interfere, and there is no need to transmit the resource conflict information to the second terminal. The configuration modes for RSRP threshold information may include but not limited to the following: a. the RSRP threshold information is carried by the resource conflict information; b. the RSRP threshold information is configured by other signals, which may be an RRC signaling; c. the RSRP threshold is pre-configured.

For example: after the first terminal receives the data packet transmitted from the second terminal, the first terminal first determines whether a resource conflict occurs based on the RSRP threshold value. For example, assuming the RSRP threshold data of the data packet is −65 dBm, if the RSRP value of the data packet received by the first terminal exceeds −65 dBm and the data packet occupies the same time-frequency resources as the data packets transmitted from other terminals, then it is indicated that a resource conflict occurs. The first terminal transmits the resource conflict information and the RSRP threshold value to the second terminal. In this way, after the second terminal receives the resource conflict information and the RSRP threshold value transmitted from the first terminal, the second terminal evaluates whether to replace the transmission resource and how to replace conflicting resource based on the resource conflict information fed back from the first terminal. For example, higher RSRP threshold fed back from the first terminal indicates more severe conflict, and the second terminal needs to immediately replace transmission resources to avoid subsequent resource conflict. Lower RSRP threshold fed back from the first terminal indicates lighter conflict. The second terminal may not replace the resource conflict, but instead retransmit it on existing resources, and expects that the first terminal to receive and merge two transmitted data packets to obtain retransmission gain and eliminate the impact of the resource conflict.

From the above embodiments, it may be seen that by transmitting association information on whether a resource conflict occurs on the resource indicated by the first SCI of the second terminal to the second terminal outside the coverage area through the first terminal, in addition to carrying the potential resource conflict information and the detected resource conflict information, the RSRP threshold information may also be carried, allowing the second terminal to have more information when selecting resource to determine the severity of the resource conflict, which reduces the probability of data packet transmission failure caused by resource collisions and improves the success rate of sidelink data packet transmission.

In an embodiment, the resource conflict information includes priority information, and the priority information includes a priority identifier of a data packet configured to determine resource conflict;

the resource conflict indication method further includes:

in case that it is determined that a resource conflict occurs on the resource indicated by the first SCI, the priority of the data packet configured to determine the resource conflict is determined based on the priority identifier; and in case that the priority of the data packet meets a specified priority condition, the resource indicated by the first SCI is replaced.

In an embodiment, if it is determined that a resource conflict occurs on the resource indicated by the first SCI, the priority of the data packet configured to determine the resource conflict is determined based on the priority identifier; in case that the priority of the data packet meets the specified priority condition, the resource indicated by the first SCI is replaced.

For example: the first terminal not only transmits resource conflict information to the second terminal, but also transmits priority information of the data packet with resource conflict to the second terminal in the same time. The priority information is the transmission priority of the data packet, the higher the priority, the more important the data packet is, and it is necessary to ensure the success rate and low latency of transmission of the data packet with high priority. After the second terminal receives the resource conflict information and priority information transmitted from the first terminal, the second terminal determines whether to replace the transmission resource and how to replace the transmission resource based on the priority information. In case that the priority of the conflicting data packet is high, the second terminal immediately replaces the transmission resource to ensure the success rate and low latency of the data packet transmission. In case that the priority of the conflicting data packet is low, the second terminal may not replace the transmission resource, but instead promote the successful reception of the data packet through the retransmission gain after multiple retransmissions.

From the above embodiments, it may be seen that by transmitting association information on whether a resource conflict occurs on the resource indicated by the first SCI of the second terminal to the second terminal outside the coverage area through the first terminal, in addition to carrying potential resource conflict information and detected resource conflict information, the priority information may also be carried, and the second terminal has more information when selecting resource to determine the severity of the resource conflict, which reduces the probability of data packet transmission failure caused by resource collisions and improves the success rate of sidelink data packet transmission.

In an embodiment, the data packet configured to determine the resource conflict is the data packet transmitted by the resource indicated by the first SCI.

In an embodiment, the priority identifier of the data packet included in the priority information for determining resource conflict may be the priority identifier of the data packet transmitted by the resource indicated by the first SCI.

The second terminal may determine a next resource selection process based on the priority information of the data packet. For example: in case that the priority of the conflicting data packet is higher, the second terminal immediately replaces the transmission resource to ensure the success rate and low latency of the data packet transmission; in case that the priority of the conflicting data packet is lower, the second terminal may not replace the transmission resource, but instead promote the successful reception of the data packet through the retransmission gain after multiple retransmissions.

As may be seen from the above embodiments, by including the priority information in the resource conflict information, the second terminal may have more information to determine the severity of the resource conflict when selecting resource, to reduce the probability of data packet transmission failure caused by resource collisions, and improving the success rate of sidelink data packet transmission.

In an embodiment, the resource conflict information includes zone identifier (ID) information, where the zone identifier information includes a grid identifier for a geographic location of the first terminal;

the resource conflict indication method further includes:

in case that it is determined that a resource conflict occurs between the resource indicated by the first SCI, a distance between the first terminal and the second terminal is determined based on the grid identifier for the geographic location; and in case that the distance meets a specified distance condition, replacing the resource indicated by the first SCI.

In an embodiment, the zone ID information is an ID of the geographic grid where the first terminal is located. While reporting the resource conflict information, the first terminal also reports a direct zone ID, which helps the second terminal determine the next resource selection process based on the zone ID.

As shown in FIG. 3, if terminal B receives the zone ID of terminal A, then the terminal B calculates a distance between the terminal A and the terminal B based on the zone ID of the terminal B, and the terminal B may determine the severity of the resource conflict based on the distance. A short distance between the terminal A and the terminal B indicates that the resource conflict is relatively severe, and the terminal B immediately replaces the transmission resource to avoid further interference; a long distance between the terminal A and the terminal B indicates that the resource conflict is relatively light, and the terminal B does not immediately replace the transmission resource but wait for further information.

As may be seen from the above embodiments, by including zone identifier information in resource conflict information, the terminal B may have more information to determine the severity of the resource conflict when selecting resource, to reduce the probability of data packet transmission failure caused by resource collisions, and improving the success rate of sidelink data packet transmission.

In an embodiment, the resource conflict information includes resource conflict type information, and the resource conflict type information includes a type identifier for representing a type of the resource conflict;

the resource conflict indication method further includes:

in case that it is determined that a resource conflict occurs on the resource indicated by the first SCI, a type of the resource conflict is determined based on the type identifier; and replacing the resource indicated by the first SCI based on the type of the resource conflict.

In an embodiment, the type of the resource conflict may include but not limited to the following: a potential resource conflict and a detected resource conflict.

The potential resource conflict may refer to resource conflict that have not occurred, that is, a first terminal transmits resource conflict information to a second terminal before the resource conflict occurs.

For example: as shown in FIG. 4, the terminal B transmits SCI on slot 2 of subchannel 1, and the terminal C transmits SCI on slot 3 of subchannel 3. Both SCI indicate that the resource on slot 6 of subchannel 2 will be used by the terminal B and the terminal C respectively to transmit data, resulting in resource conflict. And the terminal A detects the SCI transmitted from the terminal B and the terminal C on slot 5, and learns about the resource conflict information. Therefore, the terminal A transmits the resource conflict information to the terminal B on slot 5, and the terminal B will replace the transmission resource to avoid resource conflict. Since the terminal A transmitting resource conflict information to the terminal B before the resource conflict occurs, this is the potential resource conflict. It may be seen that the terminal A transmits, to the terminal B, association information on whether a resource conflict occurs on the resource indicated by the SCI of the terminal B before resource conflict occurs, allowing the terminal B to re-select resource, avoiding conflicting resource, reducing the probability of data packet transmission failure caused by the resource collision, and improving the success rate of sidelink data packet transmission.

For another example: as shown in FIG. 5, the terminal B transmits SCI on slot 2 of subchannel 1, and the terminal C transmits SCI on slot 3 of subchannel 3. Both SCI indicate that the resource on slot 6 of subchannel 2 will be used by the terminal B and the terminal C respectively to transmit data, resulting in resource conflict. And terminal A only detected the SCI transmitted from the terminal B and terminal C on slot 7, and learned about the resource conflict information. Therefore, the terminal A transmits the resource conflict information to the terminal B and terminal C on slot 7, and terminal B and terminal C will replace the transmission resources and retransmit the data separately. Since terminal A transmits resource conflict information to the terminal B after a resource conflict occurs, this is a detected resource conflict. It may be seen that terminal A only transmits association information on whether the resource indicated by the SCI of terminal B have resource conflict to the terminal B and terminal C after resource conflict occur, allowing terminal B and terminal C to retransmit, avoiding conflicting resource, reducing the probability of data packet transmission failure caused by resource collisions, and improving the success rate of sidelink data packet transmission.

As may be seen from the above embodiments, when a resource conflict occurs, the first terminal determines the type of the resource conflict based on the type identifier and replaces the resource indicated by the first SCI. This allows the second terminal to re-select resources, avoid conflicting resource, reduce the probability of data packet transmission failure caused by resource collisions, and improve the success rate of sidelink data packet transmission.

In an embodiment, an information length occupied by the type identifier for representing the type of the resource conflict is 1 bit; the type of the resource conflict includes a potential resource conflict or a detected resource conflict.

In an embodiment, 1 bit may be configured to indicate the type of the resource conflict present in the current resource conflict information. For example: 0 indicates that the resource conflict type is a potential resource conflict, and 1 indicates that the resource conflict type is a detected resource conflict. For another example: 0 indicates that the resource conflict type is a detected resource conflict, and 1 indicates that the resource conflict type is a potential resource conflict. As shown in Table 1, Table 1 is a table that 1 bit is configured to indicate the type of the resource conflict information.

TABLE 1

| Resource conflict information | Resource Conflict Types |
|---|---|
| 0 | Potential resource conflict |
| 1 | Detected resource conflict |

The type of the resource conflict includes the potential resource conflict or the detected resource conflict. The potential resource conflict refers to the first terminal transmitting resource conflict information to the second terminal before the resource conflict occurs; the detected resource conflict refers to the first terminal transmitting resource conflict information to the second terminal after the resource conflict occurs.

As may be seen from the above embodiments, by setting the length of information occupied by the type identifier to 1 bit, signaling overhead is saved.

In an embodiment, the information length occupied by the type identifier for representing the type of the resource conflict is 2 bits; the type of the resource conflict includes any one of the following: no resource conflict;

existence of a potential resource conflict;

existence of a detected resource conflict; and existence of the potential resource conflict and the detected resource conflict.

In an embodiment, 2 bits may be configured to indicate the type of the resource conflict present in the current resource conflict information. For example: 00, 01, 10, and 11 respectively indicate that no resource conflict, existence of the potential resource conflict, existence of the detected resource conflict, existence of the potential resource conflict and the detected resource conflict. For another example: 00, 01, 10, and 11 respectively indicate that no resource conflict, existence of the detected resource conflict, existence of the potential resource conflict, existence of the potential resource conflict and the detected resource conflict. As shown in Table 2, Table 2 is a table that 2 bits are configured to indicate the type of the resource conflict information.

TABLE 2

| Resource conflict information | Resource Conflict Types |
|---|---|
| 00 | No resource conflict |
| 01 | Existence of the detected resource conflict |
| 10 | Existence of the potential resource conflict |
| 11 | Existence of the detected resource conflict and the potential resource conflict |

As may be seen from the above embodiments, by setting the length of information occupied by type identifier to 2 bits, the type indication mode is enriched and the signaling overhead are saved.

In an embodiment, when receiving the resource conflict information transmitted from the first terminal in step 601, the method may include:

receiving the resource conflict information transmitted from the first terminal through one or more types of signaling; and the one or more types of signaling include: a second SCI and/or a radio resource control (RRC) signaling.

In an embodiment, when the second terminal receives the resource conflict information transmitted from the first terminal, the resource conflict information may be carried by one or more types of signaling. In case that the resource conflict information is transmitted from the first terminal to the second terminal through a sidelink, then the resource conflict information may be carried by the second SCI and/or a radio resource control (RRC) signaling.

As may be seen from the above embodiments, receiving the resource conflict information transmitted from the first terminal through one or more types of signaling enriches the implementation methods of the resource conflict information reception and improves the efficiency of the resource conflict indication.

Below are two embodiments illustrating the resource conflict indication process mentioned above:

Embodiment One

Figure 7:
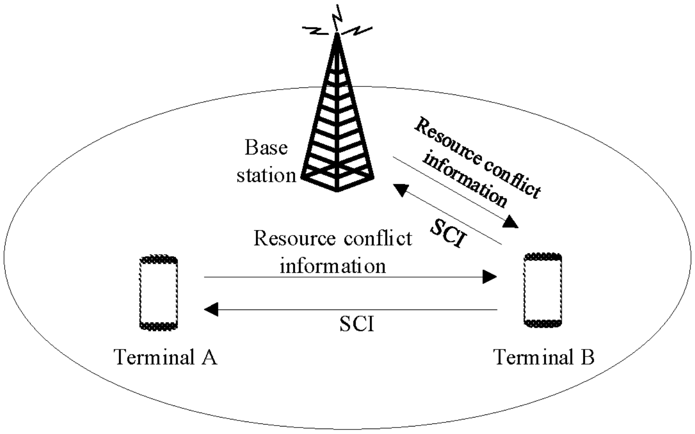
FIG. 7 is a first schematic diagram of an application scenario of a resource conflict indication method according to an embodiment of the present application.
Figure 8:
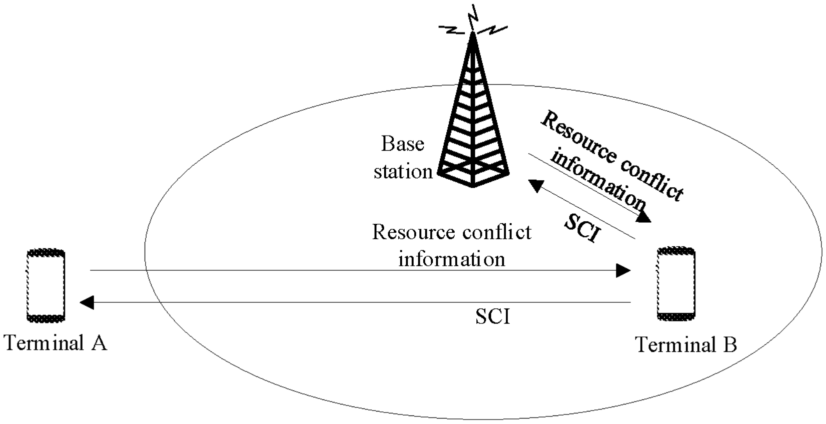
FIG. 8 is a second schematic diagram of an application scenario of a resource conflict indication method according to an embodiment of the present application.

FIG. 7 is a first schematic diagram of an application scenario of a resource conflict indication method according to an embodiment of the present application; FIG. 8 is a second schematic diagram of an application scenario of the resource conflict indication method according to an embodiment of the present application.

In FIG. 7, both a terminal A and a terminal B are located within the coverage of a base station; in FIG. 8, the terminal A is located outside the coverage of the base station, and terminal the B is located within the coverage of the base station. In both cases, the terminal B is located within a radio network coverage of the base station, and the terminal B transmits SCI and both the terminal A and the base station may receive the SCI. In this case, resource conflict information may be transmitted from the terminal A or from the base station to the terminal B. The specific transmission process of the resource conflict information includes the following steps.

(1) In case that the resource conflict information is transmitted from the terminal A to the terminal B through a sidelink, the resource conflict information may be carried by the following modes:

the resource conflict information is carried by SCI; and the resource conflict information is carried by an RRC signaling.

(2) In case that the resource conflict information is transmitted from the base station to the terminal B through an air interface link, the resource conflict information may be carried by the following mode:

the resource conflict information is carried by an RRC signaling.

In an embodiment, in case that the resource conflict information is transmitted to the terminal B by both the terminal A and the base station simultaneously, the resource conflict information may be carried by the following mode:

the resource conflict information is carried by a mixture of the above carriers, that is, the resource conflict information is indicated by the SCI, and the RSRP information is indicated by the RRC signaling.

Embodiment Two

Figure 9:
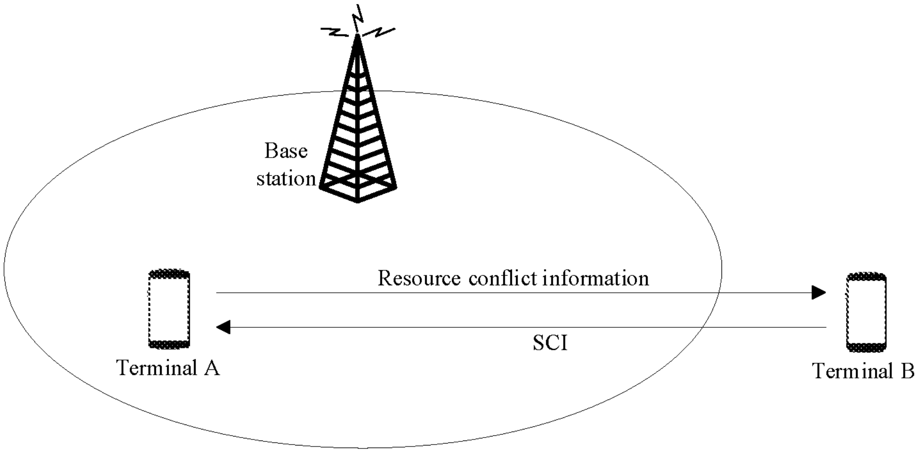
FIG. 9 is a third schematic diagram of an application scenario of a resource conflict indication method according to an embodiment of the present application.
Figure 10:
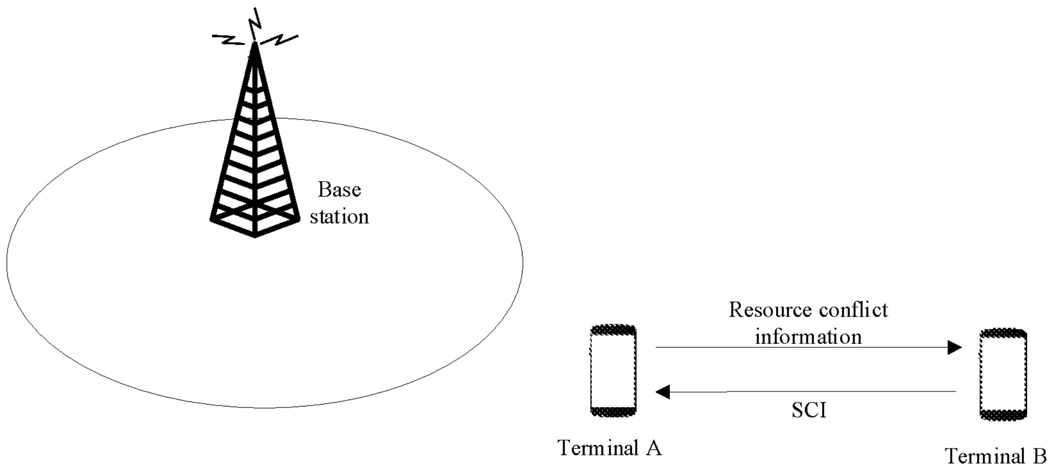
FIG. 10 is a fourth schematic diagram of an application scenario of a resource conflict indication method according to an embodiment of the present application.

FIG. 9 is a third schematic diagram of an application scenario of a resource conflict indication method according to an embodiment of the present application; FIG. 10 is a fourth schematic diagram of an application scenario of a resource conflict indication method according to an embodiment of the present application.

In FIG. 9, a terminal A is located within the coverage of a base station, and a terminal B is located outside the coverage of the base station; in FIG. 10, both the terminal A and the terminal B are located outside the coverage of the base station. In the above two cases, the terminal B is located outside a radio network coverage of the base station, and when the terminal B transmits SCI, only the terminal A may receive the DCI, and the base station cannot receive the DCI. Resource conflict information may only be transmitted from the terminal A to the terminal B. The specific process of transmitting the resource conflict information includes:

in case that the resource conflict information is transmitted from the terminal A to the terminal B through a sidelink, the resource conflict information may be carried by the following modes:

the resource conflict information is carried by SCI; and the resource conflict information is carried by an RRC signaling.

Figure 11:
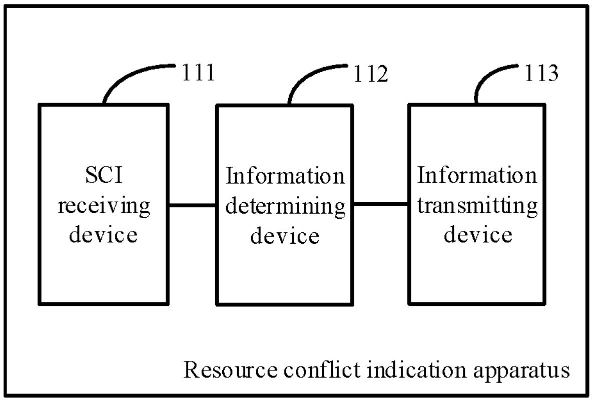
FIG. 11 is a first schematic structural diagram of a resource conflict indication apparatus according to an embodiment of the present application.

FIG. 11 is a first schematic structural diagram of a resource conflict indication apparatus according to an embodiment of the present application, and the resource conflict indication apparatus may be applied to a first terminal. For example, the first terminal is a terminal A, and the second terminal is a terminal B. The terminal A may communicate directly with the terminal B through a sidelink. In one embodiment, the resource conflict indication apparatus may implement the resource conflict indication method shown in FIG. 2; as shown in FIG. 11, the resource conflict indication apparatus may include:

a sidelink control information (SCI) receiving device 111, configured to receive a first SCI transmitted from a second terminal;

an information determining device 112, configured to determine resource conflict information based on the first SCI, where the resource conflict information is configured to indicate whether a resource conflict occurs on the resource indicated by the first SCI; and an information transmitting device 113, configured to transmit the resource conflict information to the second terminal.

Further, on the basis of the above apparatus, the resource conflict information includes at least one of the following:

reference signal receiving power (RSRP) threshold information, where the RSRP threshold information includes an RSRP threshold value configured to determine resource conflict;

priority information, where the priority information includes a priority identifier of a data packet configured to determine resource conflict;

zone identifier information, where the zone identifier information includes a grid identifier for a geographic location of the first terminal; or resource conflict type information, where the resource conflict type information includes a type identifier for representing a type of the resource conflict.

Furthermore, on the basis on the above apparatus, the data packet is a data packet transmitted through the resource indicated by the first SCI.

Furthermore, on the basis of the above apparatus, an information length occupied by the type identifier is 1 bit; the type of the resource conflict includes a potential resource conflict or a detected resource conflict.

Furthermore, on the basis of the above apparatus, the information length occupied by the type identifier is 2 bits; the type of the resource conflict includes any one of the following:

no resource conflict;

existence of a potential resource conflict;

existence of a detected resource conflict; and existence of the potential resource conflict and the detected resource conflict.

Furthermore, on the basis of the above apparatus, the information transmitting device includes:

a determining subdevice, configured to determine one or more types of signaling configured to carry the resource conflict information; and a transmitting subdevice, configured to transmit the resource conflict information to the second terminal through one or more types of signaling.

Furthermore, based on the above apparatus, the one or more types of signaling include: a second SCI and/or a radio resource control (RRC) signaling.

It should be noted that, the division of units in the embodiments of the present application is schematic, and is only a logical function division, and other division manners may be performed in actual implementation. In an embodiment, the functional units in the various embodiments of the present application can be integrated into one processing unit, or each unit can exist alone physically, or two or more units can be integrated into one unit. The aforementioned integrated unit can be implemented in the form of hardware or software functional unit.

In case that the integrated unit is implemented in the form of a software functional unit and sold or used as an independent product, it can be stored in a processor readable storage medium. Based on such understanding, the solutions of the present application in essence or a part of the solutions that contributes to the related art, or all or part of the solutions, can be embodied in the form of a software product, which is stored in a storage medium, including several instructions to cause a computer device (which can be a personal computer, server, or network device, etc.) or a processor to perform all or part of the steps of the methods described in the respective embodiments of the present application. The storage medium described above includes various media that can store program codes, such as USB flash disk, mobile hard disk, read-only memory (ROM), random access memory (RAM), magnetic disk, or optical disk.

It should be noted that the above-mentioned apparatus according to an embodiment of the present application may achieve all the method steps implemented in the above method embodiments, and may achieve the same effect. The same parts and beneficial effects as in the method embodiments in this embodiment are not elaborated in detail.

Figure 12:
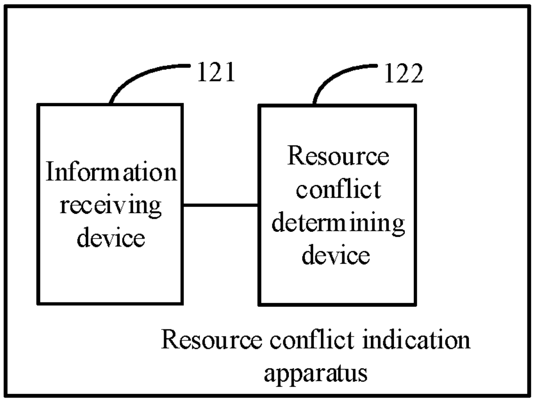
FIG. 12 is a second schematic structural diagram of a resource conflict indication apparatus according to an embodiment of the present application.

FIG. 12 is a second schematic structural diagram of a resource conflict indication apparatus according to an embodiment of the present application, and the resource conflict indication apparatus may be applied to a second terminal. For example, the first terminal is a terminal A, and the second terminal is a terminal B. The terminal A may communicate directly with terminal B through a sidelink. In one embodiment, the resource conflict indication apparatus may implement the resource conflict indication method shown in FIG. 6; as shown in FIG. 12, the resource conflict indication apparatus may include:

an information receiving device 121, configured to receive resource conflict information transmitted from a first terminal, the resource conflict information is determined by the first terminal based on first sidelink control information (SCI) transmitted from a second terminal, and the resource conflict information is used to indicate whether a resource conflict occurs on a resource indicated by the first SCI; and a resource conflict determining device 122, configured to determine whether a resource conflict occurs on the resource indicated by the first SCI based on the resource conflict information.

Furthermore, on the basis of the above apparatus, the resource conflict information includes reference signal receiving power (RSRP) threshold information, and the RSRP threshold information includes an RSRP threshold value configured to determine a resource conflict; and the resource conflict indication apparatus further includes:

an RSRP threshold value obtaining device, configured to, in case that it is determined that a resource conflict occurs on the resource indicated by the first SCI, obtaining the RSRP threshold value for determining the resource conflict; and a first replacing processing device, configured to, in case that the RSRP threshold value meets a specified threshold condition, replacing the resource indicated by the first SCI.

Furthermore, on the basis of the above apparatus, the resource conflict information includes priority information, and the priority information includes a priority identifier of a data packet configured to determine resource conflict; and the resource conflict indication apparatus further includes:

a priority determining device, configured to, in case that it is determined that the resource conflict occurs on the resource indicated by the first SCI, determining a priority of the data packet with resource conflict based on the priority identifier; and a second replacing processing device, configured to, in case that the priority of the data packet meets a specified priority condition, replacing the resource indicated by the first SCI.

Furthermore, on the basis of the above apparatus, the data packet is a data packet transmitted through the resource indicated by the first SCI.

Furthermore, on the basis of the above apparatus, the resource conflict information includes zone identifier information, and the zone identifier information includes a grid identifier for a geographic location of the first terminal; and the resource conflict indication apparatus further includes:

a distance determining device, configured to, in case that it is determined that the resource conflict occurs on the resource indicated by the first SCI, determining a distance between the first terminal and the second terminal based on the grid identifier for the geographic location; and a third replacing processing device, configured to, in case that the distance meets a specified distance condition, replacing the resource indicated by the first SCI.

Furthermore, on the basis of the above apparatus, the resource conflict information includes resource conflict type information, where the resource conflict type information includes a type identifier for representing a type of the resource conflict; and the resource conflict indication apparatus further includes:

a type determining device, configured to, in case that it is determined that the resource conflict occurs on the resource indicated by the first SCI, determining the type of the resource conflict based on the type identifier; and a fourth replacing processing device, configured to replace the resource indicated by the first SCI based on the type of the resource conflict.

Furthermore, on the basis of the above apparatus, an information length occupied by the type identifier is 1 bit; the type of the resource conflict includes a potential resource conflict or a detected resource conflict.

Furthermore, on the basis of the above apparatus, the information length occupied by the type identifier is 2 bits; the type of the resource conflict includes any one of the following:

no resource conflict;

existence of a potential resource conflict;

existence of a detected resource conflict; and existence of the potential resource conflict and the detected resource conflict.

Furthermore, on the basis of the above apparatus, the information receiving device is used for:

receiving the resource conflict information transmitted from the first terminal through one or more types of signaling; and the one or more types of signaling include: a second SCI and/or a radio resource control (RRC) signaling.

It should be noted that, the division of units in the embodiments of the present application is schematic, and is only a logical function division, and other division manners may be performed in actual implementation. In an embodiment, the functional units in the various embodiments of the present application can be integrated into one processing unit, or each unit can exist alone physically, or two or more units can be integrated into one unit. The aforementioned integrated unit can be implemented in the form of hardware or software functional unit.

In case that the integrated unit is implemented in the form of a software functional unit and sold or used as an independent product, it can be stored in a processor readable storage medium. Based on such understanding, the solutions of the present application in essence or a part of the solutions that contributes to the related art, or all or part of the solutions, can be embodied in the form of a software product, which is stored in a storage medium, including several instructions to cause a computer device (which can be a personal computer, server, or network device, etc.) or a processor to perform all or part of the steps of the methods described in the respective embodiments of the present application. The storage medium described above includes various media that can store program codes, such as USB flash disk, mobile hard disk, read-only memory (ROM), random access memory (RAM), magnetic disk, or optical disk.

It should be noted that the above-mentioned apparatus according to an embodiment of the present application may achieve all the method steps implemented in the above method embodiments, and may achieve the same effect. The same parts and beneficial effects as in the method embodiments in this embodiment are not elaborated in detail.

Figure 13:
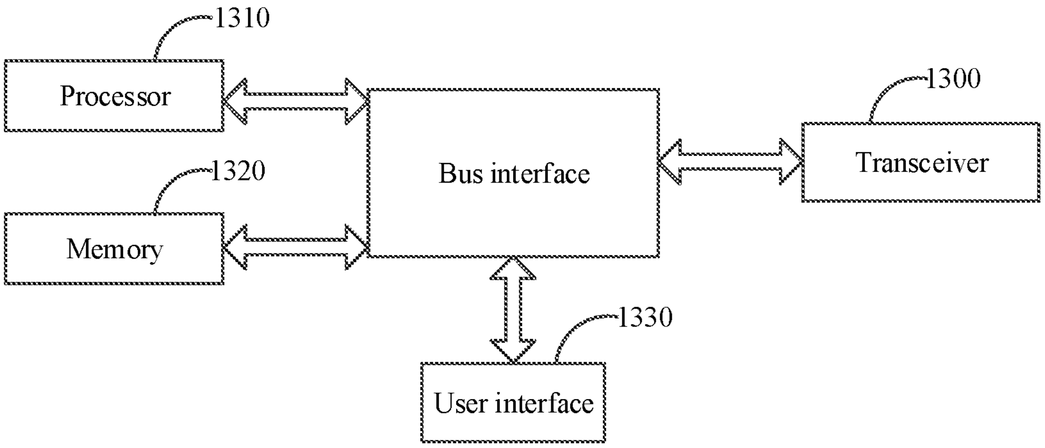
FIG. 13 is a first schematic structural diagram of a terminal device according to an embodiment of the present application.

FIG. 13 is a first schematic structural diagram of a terminal device according to an embodiment of the present application; the terminal device may be a first terminal. For example: the first terminal is terminal A, and a second terminal is terminal B. The terminal A may communicate directly with the terminal B through a sidelink. The terminal device may be configured to perform the resource conflict indication method shown in FIG. 2, the method including:

receiving a first SCI transmitted from a second terminal;

determining resource conflict information based on the first SCI, where the resource conflict information is configured to indicate whether a resource conflict occurs on the resource indicated by the first SCI; and transmitting the resource conflict information to the second terminal.

As shown in FIG. 13, a transceiver 1300 is configured to receive and transmit data under control of a processor 1310. In FIG. 13, a bus architecture may include any number of interconnected buses and bridges, one or more processors represented by the processor 1310 and various circuits of the memory represented by a memory 1320 are linked together. The bus architecture can also link together various other circuits such as peripherals, voltage regulators, and power management circuits, which are all well known in the art and therefore not described further herein. The bus interface provides an interface. The transceiver 1300 may be multiple elements, that is, including a transmitter and a receiver, providing a unit for communicating with various other devices over transmission media, including wireless channels, wired channels, optical cables, and other transmission media. For different user devices, a user interface 1330 may also be an interface that may connect external and internal devices, including but not limited to small keyboards, displays, speakers, microphones, joysticks, etc.

The processor 1310 is used for managing the bus architecture and general processing, and the memory 1320 may store data used by the processor 1310 when performing operations.

In an embodiment, the processor 1310 may be a central processing unit (CPU), an application specific integrated circuit (ASIC), a field-programmable gate array (FPGA) or a complex programmable logic device (CPLD), the processor can also adopt a multi-core architecture.

The processor is configured to execute any of the methods provided in the present application by invoking computer programs stored in the memory and executing the obtained executable instructions. The processor and the memory may also be arranged physically separately.

Figure 14:
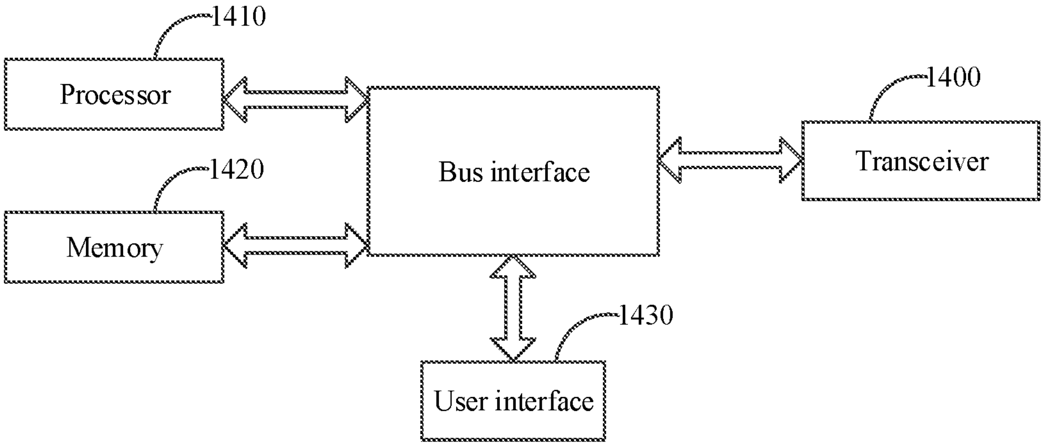
FIG. 14 is a second schematic structural diagram of a terminal device according to an embodiment of the present application.

FIG. 14 is a second schematic structural diagram of a terminal device according to an embodiment of the present application; the terminal device may be a second terminal. For example: the first terminal is a terminal A, and a second terminal is a terminal B. The terminal A may communicate directly with the terminal B through a sidelink. The terminal device may be configured to perform the resource conflict indication method shown in FIG. 6, the method including:

receiving resource conflict information transmitted from a first terminal, the resource conflict information is determined by the first terminal based on first sidelink control information (SCI) transmitted from a second terminal, and the resource conflict information is configured to indicate whether a resource conflict occurs on a resource indicated by the first SCI; and determining whether a resource conflict occurs on the resource indicated by the first SCI based on the resource conflict information.

As shown in FIG. 14, a transceiver 1400 is configured to receive and transmit data under control of a processor 1410. In FIG. 14, a bus architecture may include any number of interconnected buses and bridges, one or more processors represented by the processor 1410 and various circuits of the memory represented by a memory 1420 are linked together. The bus architecture can also link together various other circuits such as peripherals, voltage regulators, and power management circuits, which are all well known in the art and therefore not described further herein. The bus interface provides an interface. The transceiver 1400 may be multiple elements, including a transmitter and a receiver, providing a unit for communicating with various other devices over transmission media, including wireless channels, wired channels, optical cables, and other transmission media. For different user devices, a user interface 1430 may also be an interface that may connect external and internal devices, including but not limited to small keyboards, displays, speakers, microphones, joysticks, etc.

The processor 1410 is used for managing the bus architecture and general processing, and the memory 1420 may store data used by the processor 1410 when performing operations.

In an embodiment, the processor 1410 may be a central processing unit (CPU), an application specific integrated circuit (ASIC), a field-programmable gate array (FPGA) or a complex programmable logic device (CPLD), the processor can also adopt a multi-core architecture.

The processor is configured to execute any of the methods provided in the present application by invoking computer programs stored in the memory and executing the obtained executable instructions. The processor and the memory may also be arranged physically separately.

The embodiments of the present applications further provide a processor readable storage medium storing a computer program that causes, when executed by a processor, the processor to perform the methods provided in the aforementioned embodiments, the method including:

receiving a first SCI transmitted from a second terminal;

determining resource conflict information based on the first SCI, where the resource conflict information is configured to indicate whether a resource conflict occurs on the resource indicated by the first SCI; and transmitting the resource conflict information to the second terminal.

The processor readable storage medium can be any available medium or data storage device that can be accessed by the processor, including but not limited to, a magnetic storage (e.g., a floppy disk, a hard disk, a magnetic tape, a magneto-optical disk (MO), etc.), an optical memory (such as CD, DVD, BD, HVD, etc.), and a semiconductor memory (such as ROM, EPROM, EEPROM, non-volatile memory (NAND FLASH), solid-state drive (SSD)), etc.

The embodiments of the present applications further provide a processor readable storage medium storing a computer program that causes, when executed by a processor, the processor to perform the methods provided in the aforementioned embodiments, the method including:

receiving resource conflict information transmitted from a first terminal, and the resource conflict information is determined by the first terminal based on first sidelink control information (SCI) transmitted from a second terminal, and the resource conflict information is configured to indicate whether a resource conflict occurs on a resource indicated by the first SCI; and determining whether a resource conflict occurs on the resource indicated by the first SCI based on the resource conflict information.

The processor readable storage medium can be any available medium or data storage device that can be accessed by the processor, including but not limited to, a magnetic storage (e.g., a floppy disk, a hard disk, a magnetic tape, a magneto-optical disk (MO), etc.), an optical memory (such as CD, DVD, BD, HVD, etc.), and a semiconductor memory (such as ROM, EPROM, EEPROM, non-volatile memory (NAND FLASH), solid-state drive (SSD)), etc.

Embodiments of the present application may be provided as a method, system, or computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media having computer-usable program code embodied therein, including but not limited to disk storage, optical storage, and the like.

The present application is described with reference to flow charts and/or block diagrams of methods, apparatus (systems), and computer program products according to embodiments of the present application. It will be understood that each flow and/or block in the flow charts and/or block diagrams, and combinations thereof can be implemented by computer-executable instructions. These computer-executable instructions may be provided to processors of a general-purpose computer, a special purpose computer, an embedded processor or other programmable data processing device to produce a machine and the instructions executed by the processor of the computer or other programmable data processing device form a means for performing the functions specified in one or more flows in a flowchart and/or one or more blocks of a block diagram.

These processor-executable instructions may be stored in processor-readable memory capable of directing a computer or other programmable data processing apparatus to operate in a particular manner, and the instructions stored in the processor-readable memory may result in a manufacture including instruction means, the instruction means can perform the functions specified in one or more flows of the flowchart and/or one or more blocks of the block diagram.

These processor-executable instructions can also be loaded onto a computer or other programmable data processing device to cause a series of operational steps to be performed on the computer or other programmable device to produce a computer-implemented process and instructions performed on the computer or other programmable devices provide steps for performing the functions specified in one or more flows of the flowchart and/or one or more blocks of the block diagram.

What is claimed is:

1. A resource conflict indication method, applied to a first terminal, comprising:

receiving first sidelink control information (SCI) transmitted from a second terminal;

determining resource conflict information based on the first SCI, wherein the resource conflict information is used to indicate whether a resource conflict occurs on a resource indicated by the first SCI; and transmitting the resource conflict information to the second terminal;

wherein the resource conflict information comprises resource conflict type information, the resource conflict type information comprises a type identifier for representing a type of the resource conflict;

wherein an information length occupied by the type identifier is 1 bit, and the type of the resource conflict comprises a potential resource conflict or a detected resource conflict;

or, wherein an information length occupied by the type identifier is 2 bits, and the type of the resource conflict comprises any one of the following:

no resource conflict;

existence of a potential resource conflict;

existence of a detected resource conflict; and existence of the potential resource conflict and the detected resource conflict.

2. The method of claim 1, wherein the resource conflict information comprises at least one of the following:

reference signal receiving power (RSRP) threshold information, wherein the RSRP threshold information comprises an RSRP threshold value for determining the resource conflict;

priority information, wherein the priority information comprises a priority identifier of a data packet with resource conflict; or zone identifier information, wherein the zone identifier information comprises a grid identifier for a geographic location of the first terminal.

3. The method of claim 1, wherein transmitting the resource conflict information to the second terminal comprises:

determining one or more types of signaling used to carry the resource conflict information; and transmitting the resource conflict information to the second terminal through the one or more types of signaling.

4. A resource conflict indication method, applied to a second terminal, comprising:

receiving resource conflict information transmitted from a first terminal, wherein the resource conflict information is determined by the first terminal based on first sidelink control information (SCI) transmitted from the second terminal, and the resource conflict information is used to indicate whether a resource conflict occurs on a resource indicated by the first SCI; and determining whether the resource conflict occurs on the resource indicated by the first SCI based on the resource conflict information;

wherein the resource conflict information comprises resource conflict type information, the resource conflict type information comprises a type identifier for representing a type of the resource conflict;

wherein an information length occupied by the type identifier is 1 bit, and the type of the resource conflict comprises a potential resource conflict or a detected resource conflict;

or, wherein an information length occupied by the type identifier is 2 bits, the type of the resource conflict comprises any one of the following:

no resource conflict;

existence of a potential resource conflict;

existence of a detected resource conflict; and existence of the potential resource conflict and the detected resource conflict.

5. The method of claim 4, wherein the resource conflict information comprises reference signal received power (RSRP) threshold information, wherein the RSRP threshold information comprises an RSRP threshold value for determining the resource conflict;

the method further comprises:

in case that it is determined that the resource conflict occurs on the resource indicated by the first SCI, obtaining the RSRP threshold value for determining the resource conflict; and in case that the RSRP threshold value meets a specified threshold condition, replacing the resource indicated by the first SCI.

6. The method of claim 4, wherein the resource conflict information comprises priority information, wherein the priority information comprises a priority identifier of a data packet with resource conflict;

the method further comprises:

in case that it is determined that the resource conflict occurs on the resource indicated by the first SCI, determining a priority of the data packet with resource conflict based on the priority identifier; and in case that the priority of the data packet meets a specified priority condition, replacing the resource indicated by the first SCI.

7. The method of claim 4, wherein, the method further comprises:

in case that it is determined that the resource conflict occurs on the resource indicated by the first SCI, determining the type of the resource conflict based on the type identifier; and replacing the resource indicated by the first SCI based on the type of the resource conflict.

8. The method of claim 4, wherein receiving the resource conflict information transmitted from the first terminal comprises:

receiving the resource conflict information transmitted from the first terminal through one or more types of signaling; wherein the one or more types of signaling comprise a second SCI and/or a radio resource control (RRC) signaling.

9. A first terminal, comprising a memory, a transceiver, and a processor:

the memory is configured to store a computer program; the transceiver is configured to receive and transmit data under control of the processor; and the processor is configured to read the computer program stored in the memory and perform the following operations:

receiving first sidelink control information (SCI) transmitted from a second terminal;

determining resource conflict information based on the first SCI, wherein the resource conflict information is used to indicate whether a resource conflict occurs on a resource indicated by the first SCI; and transmitting the resource conflict information to the second terminal;

wherein the resource conflict information comprises resource conflict type information, the resource conflict type information comprises a type identifier for representing a type of the resource conflict;

wherein an information length occupied by the type identifier is 1 bit, and the type of the resource conflict comprises a potential resource conflict or a detected resource conflict;

or, wherein an information length occupied by the type identifier is 2 bits, and the type of the resource conflict comprises any one of the following:

no resource conflict;

existence of a potential resource conflict;

existence of a detected resource conflict; and existence of the potential resource conflict and the detected resource conflict.

10. The first terminal of claim 9, wherein the resource conflict information comprises at least one of the following:

reference signal receiving power (RSRP) threshold information, wherein the RSRP threshold information comprises an RSRP threshold value for determining the resource conflict;

priority information, wherein the priority information comprises a priority identifier of a data packet with resource conflict; or zone identifier information, wherein the zone identifier information comprises a grid identifier for a geographic location of the first terminal.

11. The first terminal of claim 9, wherein transmitting the resource conflict information to the second terminal comprises:

determining one or more types of signaling configured to carry the resource conflict information; and transmitting the resource conflict information to the second terminal through the one or more types of signaling.

12. A second terminal, comprising a memory, a transceiver, and a processor;

the memory is configured to store a computer program; the transceiver is configured to receive and transmit data under control of the processor; and the processor is configured to read the computer program stored in the memory and perform the following operations:

receiving resource conflict information transmitted from a first terminal, wherein the resource conflict information is determined by the first terminal based on first sidelink control information (SCI) transmitted from the second terminal, and the resource conflict information is used to indicate whether a resource conflict occurs on a resource indicated by the first SCI; and determining whether the resource conflict occurs on the resource indicated by the first SCI based on the resource conflict information;

wherein the resource conflict information comprises resource conflict type information, the resource conflict type information comprises a type identifier for representing a type of the resource conflict;

wherein an information length occupied by the type identifier is 1 bit, and the type of the resource conflict comprises a potential resource conflict or a detected resource conflict;

or, wherein an information length occupied by the type identifier is 2 bits, and the type of the resource conflict comprises any one of the following:

no resource conflict;

existence of a potential resource conflict;

existence of a detected resource conflict; and existence of the potential resource conflict and the detected resource conflict.

13. The second terminal of claim 12, wherein the resource conflict information comprises reference signal received power (RSRP) threshold information, wherein the RSRP threshold information comprises an RSRP threshold value for determining the resource conflict;

the processor is further configured to perform the following operations:

in case that it is determined that the resource conflict occurs on the resource indicated by the first SCI, obtaining the RSRP threshold value for determining the resource conflict; and in case that the RSRP threshold value meets a specified threshold condition, replacing the resource indicated by the first SCI.

14. The second terminal of claim 12, wherein the resource conflict information comprises priority information, wherein the priority information comprises a priority identifier of a data packet with resource conflict;

the processor is further configured to perform the following operations:

in case that it is determined that the resource conflict occurs on the resource indicated by the first SCI, determining a priority of the data packet with resource conflict based on the priority identifier; and in case that the priority of the data packet meets a specified priority condition, replacing the resource indicated by the first SCI.

15. The second terminal of claim 12, wherein the processor is further configured to perform the following operations:

in case that it is determined that the resource conflict occurs on the resource indicated by the first SCI, determining the type of the resource conflict based on the type identifier; and replacing the resource indicated by the first SCI based on the type of the resource conflict.

16. The second terminal of claim 12, wherein receiving the resource conflict information transmitted from the first terminal comprises:

receiving the resource conflict information transmitted from the first terminal through one or more types of signaling; the one or more types of signaling comprise a second SCI and/or a radio resource control (RRC) signaling.

* * * * *